US005495154A

United States Patent [19]
Carobolante

[11] Patent Number: 5,495,154
[45] Date of Patent: Feb. 27, 1996

[54] METHOD AND APPARATUS FOR KELVIN CURRENT SENSING IN A MULTI-PHASE DRIVER FOR A POLYPHASE DC MOTOR

[75] Inventor: Francesco Carobolante, Portola Valley, Calif.

[73] Assignee: SGS-Thomson Microelectronics, Inc., Carrollton, Tex.

[21] Appl. No.: 54,615

[22] Filed: Apr. 29, 1993

[51] Int. Cl.⁶ .................................................. H02P 7/00
[52] U.S. Cl. ........................... 318/254; 318/138; 318/293
[58] Field of Search .................................. 318/138, 254,
318/439, 727, 800–832, 721; 388/821,
822, 812, 813; 361/34–39, 23

[56] References Cited

U.S. PATENT DOCUMENTS

| | | | |
|---|---|---|---|
| 4,472,666 | 9/1984 | Akeda et al. | 318/254 |
| 4,491,770 | 1/1985 | Gotou | 318/254 |
| 4,494,053 | 1/1985 | Gotou | 318/254 |
| 4,500,830 | 2/1985 | Gotou et al. | 318/254 |
| 4,595,865 | 6/1986 | Jahns | 318/254 |
| 4,712,050 | 12/1987 | Nagasawa et al. | 318/254 |
| 4,777,579 | 10/1988 | Jahns | 363/98 |
| 4,780,651 | 10/1988 | Nakano et al. | 318/254 |
| 4,945,445 | 7/1990 | Schmerda et al. | 361/101 |
| 5,032,774 | 7/1991 | Juzswik | 318/293 |
| 5,122,715 | 6/1992 | Kimura et al. | 318/138 |
| 5,166,583 | 11/1992 | Min et al. | 318/138 |
| 5,173,645 | 12/1992 | Naito | 318/138 |
| 5,196,771 | 3/1993 | Naito | 318/254 |
| 5,210,475 | 5/1993 | Juzswik et al. | 318/293 |
| 5,319,291 | 6/1994 | Ramirez | 318/254 |

FOREIGN PATENT DOCUMENTS 4102574  8/1991  Germany .

OTHER PUBLICATIONS

Low, et al., "Comparison of two control strategies in development of high–torque electronically commutated drive", *IEEE Proceedings–B*, vol. 139 No. 1, (Jan., 1992) pp. 26–36.

Primary Examiner—Paul Ip
Attorney, Agent, or Firm—Richard A. Bachand; Rodney M. Anderson; Lisa K. Jorgenson

[57] ABSTRACT

A kelvin current sensing circuit in an integrated control circuit that controls the current flowing through the driving coils of a polyphase DC motor. The invention provides for adjusting the voltage to the lower driver transistors of the control circuit by having the kelvin current sensing occur internally within the chip. A ground compatible differential amplifier circuit is used in one embodiment. Each of the lower transistors are connected to the base of respective PNP transistors, the emitters of which being connected together to control one side of the differential amplifier. A control voltage is applied to the other side of the differential amplifier. The output of a comparator, that is connected to the differential amplifier, is used to control the operation of the lower driver transistors. Therefore all of the sensing is done internally in the semiconductor chip. The voltages are taken at the source of each of the lower transistors. This eliminates the parasitic resistances associated with the connection between the transistors and the sense resistor attached externally to the device. Since the kelvin current sensing is done internally, the pin which connected the inverting input of the comparator to the sensing resistor has been eliminated.

25 Claims, 2 Drawing Sheets

METHOD AND APPARATUS FOR KELVIN CURRENT SENSING IN A MULTI-PHASE DRIVER FOR A POLYPHASE DC MOTOR

BACKGROUND OF THE INVENTION

1. Field of the Invention

This invention relates to improvements in circuitry for kelvin current sensing. More particularly, the invention is drawn to voltage sensing internally within the semiconductor device to reduce the effects of any parasitic resistances while sensing the voltages.

2. Description of the Related Art

Although the invention pertains to polyphase DC motors, in general, it finds particular application with three-phase DC motors. These motors can be of the brushless, sensorless type that are used for rotating data media, such as the motors in hard disk drives, CD ROM drives, floppy disks and other computer related applications.

These motors are typically thought of as having a stator with three coils connected in a "Y" configuration, although in actual systems many stator coils may be used with multiple motor poles. In operation, the coils are selectively energized to set up a current path through two coils of the "Y" configuration and to leave a third coil floating. Another method is to energize sequentially one coil at a time by having a current path through a single coil to a center tap. In either case, a sequence of energized coils is arranged so as the current paths are changed, or commutated, at least one of the coils used to form the current path becomes a floating coil in the next sequence.

For a three phase dc motor, there are typically six driver transistors that may be, for example, CMOS transistors, that control the current applied to three stator coils. Three upper driver transistors connect power to selected coils, and three lower driver transistors connect selected coils to ground. Typically, all six driver transistors are contained on a single semiconductor integrated circuit chip. Each of the lower driver transistors are connected to an output connection of the semiconductor device, with each of the output connections being connected to the upstream side of a sense resistor, $R_{sense}$, the downstream side of which being attached to ground.

To control the lower driver transistors, a comparator is provided as a part of the circuitry of the integrated circuit chip. The comparator has a noninverting input connected to a bonding pad on the semiconductor chip that is connected to an external connection pin. A reference voltage, $V_{in}$, is supplied to the external connection pin by an outside source. Alternatively, the reference voltage may be developed internally to the device by other circuitry (not shown). The inverting input of the comparator is connected to a second bonding pad on the semiconductor chip that is connected to a second external connection pin. This second external connection pin is connected to the sense resistor, $R_{sense}$, in the manner described above. A comparison is then made between the voltages appearing on these two external connection pins, this comparison being referred to herein as "kelvin current sensing."

Thus, kelvin current sensing monitors the voltage changes across the sense resistor, $R_{sense}$, and controls the transistors that drive the stator windings in response to that voltage change. If the voltage across $R_{sense}$ becomes too large, for instance, higher than $V_{in}$, then the output of the comparator changes to cause all of the lower driver transistors to turn off.

In a typical brushless, sensorless DC motor, a sequencer is used to create signals to control the current in the various stator coils. Each coil is connected to a pin of a semiconductor device that contains an integrated circuit chip that contains the driver and control circuitry, and, in some cases, the sequencer circuit. For example, in FIG. 1, a schematic diagram of a portion of a prior art driver circuit, the stator coils 11, 12, and 13 of a three phase DC motor are shown, connected respectively to nodes A, B, and C. The sequencer circuit (not shown) supplies six sequencer signals, UA, UB, UC, LA, LB, and LC, each connected to control, directly or indirectly, one of the driver transistors. Thus, upper driver transistors 20, 21, and 22 are directly controlled by UA, UB, and UC, respectively. When any of these sequencing signals are high, the corresponding driver transistor turns on to connect the associated stator coil to $V_{cc}$.

The lower driver transistors 23, 24, and 25 are indirectly controlled by signals LA, LB, and LC. Each of the gates of the lower driver transistors 23, 24, and 25 is connected to a respective switch 26, 27, and 28. Each switch has two states. The first state is ground and the second state is the output of an operational amplifier 29. If desired, a PWM switch could be substituted for these three switches 26, 27, and 28 to control the lower driver transistors.

The lower driver transistors 23, 24, and 25 have their sources connected to the pins 30, 31, and 32, respectively. (The various pins shown in FIG. 1 represent the bonding pads, bonding wires, and external package pins, and are shown in abbreviated form for simplicity.) The pins 30, 31, and 32 are connected externally from the device, and to the upstream side of a resistor 16 ($R_{sense}$). The source terminals of the lower driver transistors 23, 24, and 25 are often not internally connected because a major metal interconnection would be necessary.

The downstream side of the resistor 16 is connected to ground. At a point near the resistor 16, a connection 35 is made between the resistor 16 and a "sense" pin 33. The pin 33 has an internal connection to the inverting input of operational amplifier 29. The noninverting input of the operational amplifier 29 is connected to a pin 34, to which a voltage signal $V_{in}$ from an external voltage source may be connected.

The output of the operational amplifier 29 is used to control the gates of the lower driver transistors 23, 24, and 25 in normal operation. Thus, when one of the lower sequencer signals LA, LB or LC is a logic high, the output of the operational amplifier 29 is connected by the respectively associated switch 26, 27, or 28 to the gate of the corresponding lower driver transistor to turn on that driver transistor. At the same time, the sequencer also sends a signal UA, UB or UC to turn on a corresponding one of the upper driver transistors. Therefore, current flows from $V_{cc}$ through the selected upper driver transistor, through two of the coils in the stator, through the selected lower driver transistor, and then through $R_{sense}$ to ground.

As the current is flowing through $R_{sense}$, the voltage may change due to fluctuations of current in the various circuit switches. If the voltage becomes larger than the voltage signal $V_{in}$, then the comparator 29 will change state and reduce conduction or turn off all of the lower driver transistors.

These structures and methods have a disadvantage in that an extra pin is needed to connect the $R_{sense}$ to the inverting input of the comparator.

SUMMARY OF THE INVENTION

It is therefore an object of the invention to provide an improved kelvin sensing circuit and method.

It is another object of the invention to provide an improved apparatus and method for adjusting the voltage to the lower driver transistor in a motor control circuit by providing a kelvin current sensing circuit completely internal to the motor driver integrated circuit chip.

According to a broad aspect of the invention, a ground compatibility differential amplifier circuit is used in a motor driver circuit. Each lower driver transistor is connected to the base of a voltage sensing transistor on the integrated circuit chip. One side of these voltage sensing transistors are interconnected to control one side of the differential amplifier. A control voltage is applied to the other side of the differential amplifier. A comparator compares the voltages on each side of the differential amplifier. The output of the comparator is connected to control the operation of the lower driver transistors, and to reduce conduction or turn off the lower driver transistors when the sensed voltage developed by the differential amplifier exceeds a predetermined threshold. Therefore, all the sensing is done internally within the semiconductor chip. Since the sensed voltages are taken at the source of each lower driver transistor, the voltage drops generated by the parasitic resistance effects associated with the connection between the driver transistors and the sense resistor $R_{sense}$, especially the bonding pad connections and the pin connections, are reduced.

Since the kelvin current sensing is done internally in the semiconductor chip, the pin that was previously required to connect the inverting input of the comparator to the resistor $R_{sense}$ is not needed. Therefore, an elimination of one pin on the semiconductor is realized.

BRIEF DESCRIPTION OF THE DRAWINGS

The invention is illustrated in the accompanying drawings, like reference numerals are used to indicate like or similar parts, and wherein.

DETAILED DESCRIPTION OF THE PREFERRED EMBODIMENTS

Figure 1:
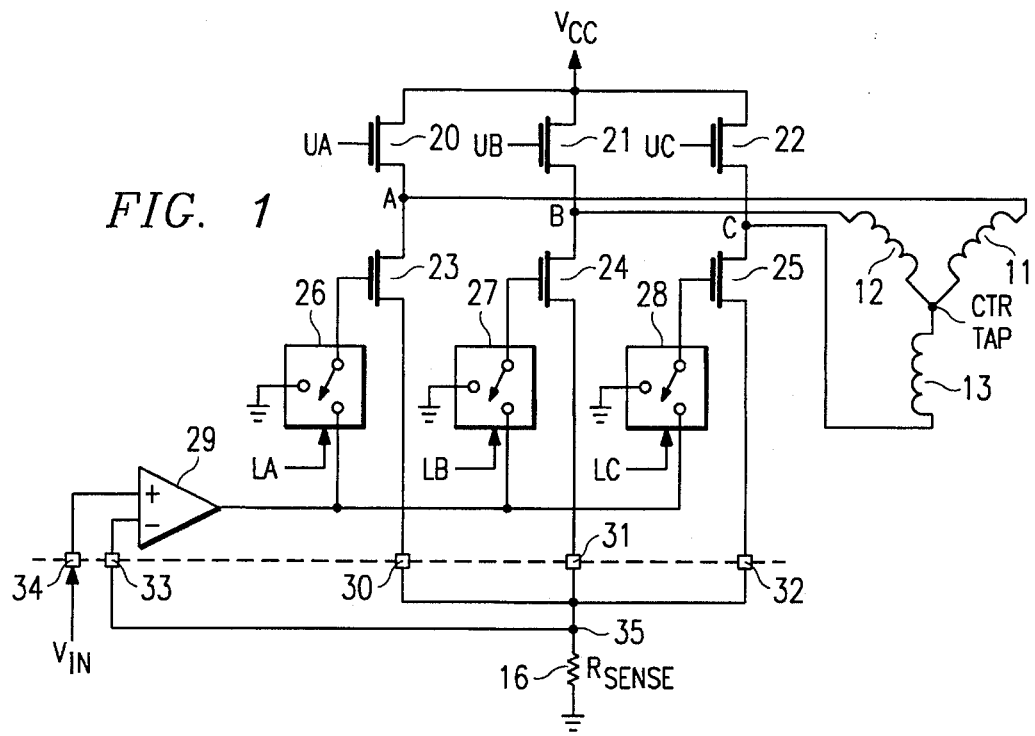
FIG. 1 is an electrical schematic diagram of a control circuit used to power a typical "Y" connected stator coil arrangement, according to the prior art.
Figure 2:
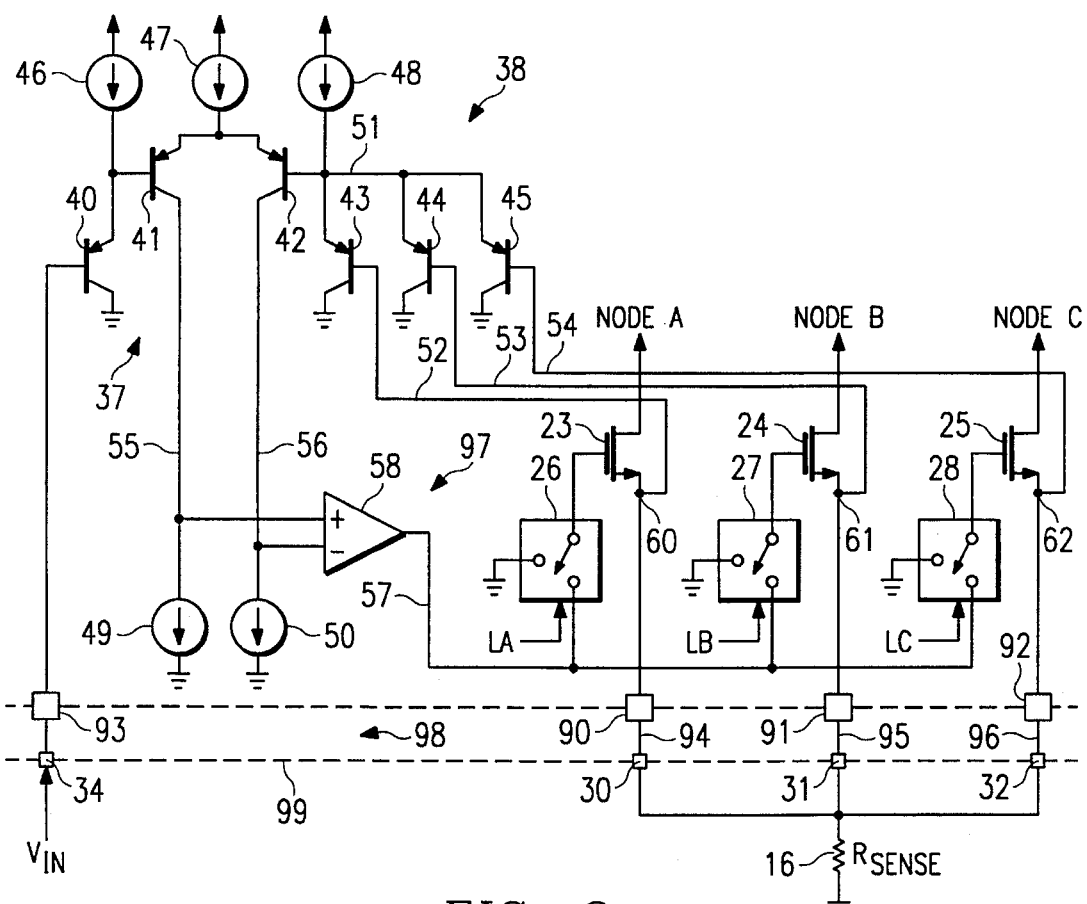
FIG. 2 is an electrical schematic diagram of the lower transistor switches connected to the kelvin current sensing circuit of the invention.

FIG. 2 is an electrical schematic diagram of a preferred embodiment of the invention. For simplicity the upper driver transistors 20, 21, and 22 and the stator windings of the DC motor above the nodes A, B, and C are not shown, as they may be similarly constructed to those shown in FIG. 1, described above. In a complete system, those elements could be attached to nodes A, B, and C as shown in FIG. 1.

Kelvin sensing is accomplished in the circuit in FIG. 1 by a differential amplifier 37 that has a reference voltage applied to one side, and a sensed voltage applied to the other side. The sensed voltage is developed by a sense circuit 38 that includes a number of sense transistors 43–45 individually connected to nodes 60–62 adjacent respective ones of the lower driver transistors 23–25. The differential amplifier 37, the sense circuit 38 and its connecting leads to the driver transistors, and the comparator 58 are all formed on the integrated circuit chip 97.

The differential amplifier includes two current paths in lines 55 and 56 in which differential currents are developed by bipolar transistors 41 and 42, which, in the embodiment shown are PNP transistors. Although bipolar PNP transistors are shown, it will be appreciated that transistors of different construction and conductivity type can be used in appropriate applications.

The $V_{in}$ signal provided to pin 34 (although it need not necessarily be external) is connected directly to the input transistor 40 on one side of the differential amplifier 37, and is referenced to ground. The emitter of the PNP transistor 40 is connected to a first current source 46 and to the base of a second PNP transistor 41. The emitter of the PNP transistor 41 is connected to a second current source 47 and also to the emitter of a PNP transistor 42 to form a differential amplifier.

On the other hand, the sensed voltage from the respective lower driver transistors 23–25 is applied to the input transistor 42 on the other side of the differential amplifier 37. Thus, the base of the PNP transistor 42 is connected to the emitters of the three PNP sense transistors 43, 44, and 45 as well as to a third current source 48.

As mentioned, the base of the PNP transistor 43 is connected to the source of the lower driver transistor 23 at point 60. Likewise, the base of the PNP transistor 44 is connected to the source of the lower driver transistor 24 at point 61. Finally, the base of the PNP transistor 45 is connected to the source of the lower driver transistor 25 at point 62.

The collector of PNP transistor 41 is connected to a current sink 49 and the non-inverting input of operational amplifier 58. The collector of PNP transistor 42 is connected to a second current sink 50 and to the inverting input of operational amplifier 58. The output of the operational amplifier 58 is connected to the transistor switches 26, 27, and 28. With this configuration, one of the pins on the semiconductor chip has been eliminated. Also, the connection needed between that pin and the sensing resistor 16 has been eliminated.

One advantage of this circuit is that each of the signal lines 52, 53, and 54, has its own sense transistor. Although bipolar PNP sense transistors are shown, it will be appreciated that transistors of different construction and conductivity type can be used in appropriate applications. Though these signal lines are connected outside the chip, each signal line may have a slightly different voltage on it when measured at the PNP transistor, due to parasitic resistances in the device. For example, the lower driver transistors 23, 24, and 25 are connected to bonding pads 90, 91, and 92, respectively, located at the edge of the integrated circuit chip 97. These bonding pads 90, 91, and 92 are connected by bonding wires 94, 95, and 96 across the cavity 98 to respective package pins 30, 31, and 32. The package pins, in turn, may be connected to external elements. Each of these connections creates parasitic resistances.

Thus, since the emitters of the PNP transistors 43, 44, and 45 are connected at the base of the PNP transistor 42, the lowest voltage appearing on the signal lines 52, 53, and 54 is transferred to signal line 51, with only the added voltage of the emitter-base intrinsic diode of transistor 43, 44, or 45.

Signal lines 55 and 56 are compared in the comparator 58 and the output signal on signal line 57 is sent to each of the transistor switches 26, 27, and 28. Although sensing is not as precise as true kelvin sensing, the added benefit of eliminating one pin on the semiconductor chip is sometimes very useful.

The embodiment shown in FIG. 2 is designed to have a compatibility with a ground that acts like an analog ground or a floating reference ground. Accordingly, for ground compatibility, the collectors of transistors 40, 43, 44, and 45 are connected to ground. It should also be noted that the reference ground is the same for the voltage signal, $V_{in}$, the ground to which $R_{sense}$ is connected, and the ground to which the collectors of the transistors 40, 43, 44, and 45 are connected.

Figure 3:
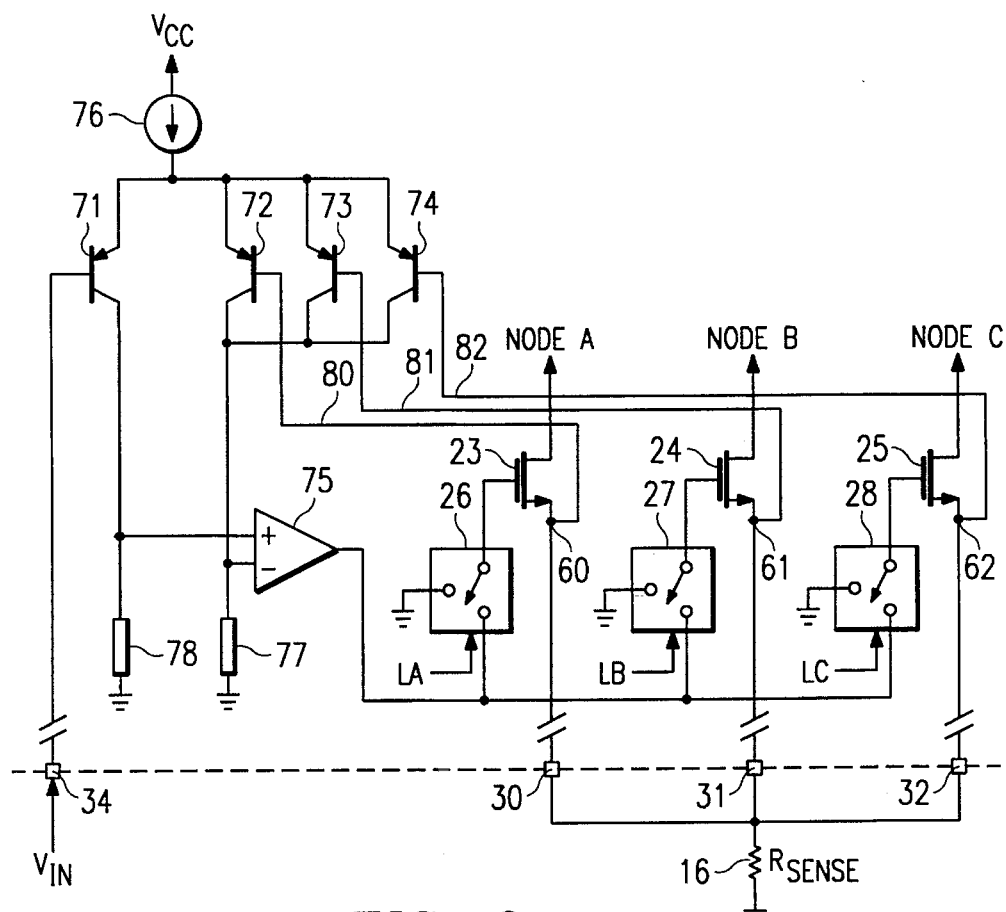
FIG. 3 is another embodiment of an electrical schematic diagram of the kelvin current sensing circuit of the invention.

Another embodiment of the invention is shown in FIG. 3. As in FIG. 2, the upper driver transistors, the stator windings of the DC motor, and the bonding pads and their connections are not shown. The differential amplifier 75 in this embodiment may or may not have ground compatibility incorporated into it. Otherwise, the circuit is the same as the circuit of FIG. 2.

A voltage signal, $V_{in}$, is applied to the base of a PNP transistor 71, internally to the device, or externally, as shown. The emitter of the transistor 71 is connected to a current source 76 and to the emitters of the PNP transistors 72, 73, and 74. The base of the PNP transistor 72 is connected to the source of the lower driver transistor 23 at point 60 by line 80. The base of the PNP transistor 73 is connected to the source of the lower driver transistor 24 at point 61 by line 81. The base of the PNP transistor 74 is connected to the source of the lower driver transistor 25 at point 62 by line 82. The collector of the PNP transistor 71 is connected to a resistive element 78, such as a resistor, a transistor, or the like, the downstream side of which being connected to ground. The collectors of the PNP transistors 72, 73, and 74 are connected and also connected to resistive element 77, such as a resistor, a transistor, or the like, the downstream side of which also being connected to ground.

The collector of the PNP transistor 71 is also connected to the non-inverting input of the operational amplifier 75 upstream of the resistive element 78. Similarly, the collectors of he PNP transistors 72, 73, and 74 are connected to the inverting input of the operational amplifier 75 upstream of the resistive element 77. The output of the operational amplifier 75 is connected to the transistor switches 26, 27, and 28 line in the previous figures.

This embodiment performs kelvin current sensing and eliminates the sensing of voltages across the parasitic resistances, like the previous embodiment, with all the sensing done internally within the semiconductor chip. In both implementations, there is the added benefit of eliminating one pin from the semiconductor chip.

To balance the differential amplifier formed by transistors 71–74, the area of transistor 71 should be appropriately changed to be proportionally larger than the other transistors. For instance, in FIG. 3, if parasitic voltage drops were significant (eg., greater than 100 mV) and only one control transistor conducts at any given time, then the emitter area of the transistor 71 should be twice that of the separate transistors 72–74 to optimize precision and in dependence of the voltage drops from parasitic resistors.

In fact, when the circuit is operating in response to normal sequence signals, only one of the three lower drivers transistors is on. Therefore, two of the three transistors are at a lower potential than the third transistor, that is, the voltage at the output of the third transistor is higher because it is connected to the driver transistor that is on. The basic premise is to have the transistor emitter area equal to the sum of the emitter areas of the input of the floating transistors.

Therefore, if there were five driver transistors with four of them off (floating) at a time, then the emitter area of the transistor connected to the reference voltage, $V_{in}$, should have four times the emitter area of any of the transistors connected to the lower driver transistors that are floating. Though the optimum area will depend on the absolute value of parasitic voltage drops, such ratio would have to be increased if the parasitic drops are small. At the limit, if the parasitic voltage drop is equal to zero, then the transistor connected to the reference voltage should have an emitter area equal to the sum of the emitter areas of all transistors connected to the sense resistor. This change in transistor size applies to all of the embodiments.

Figure 4:
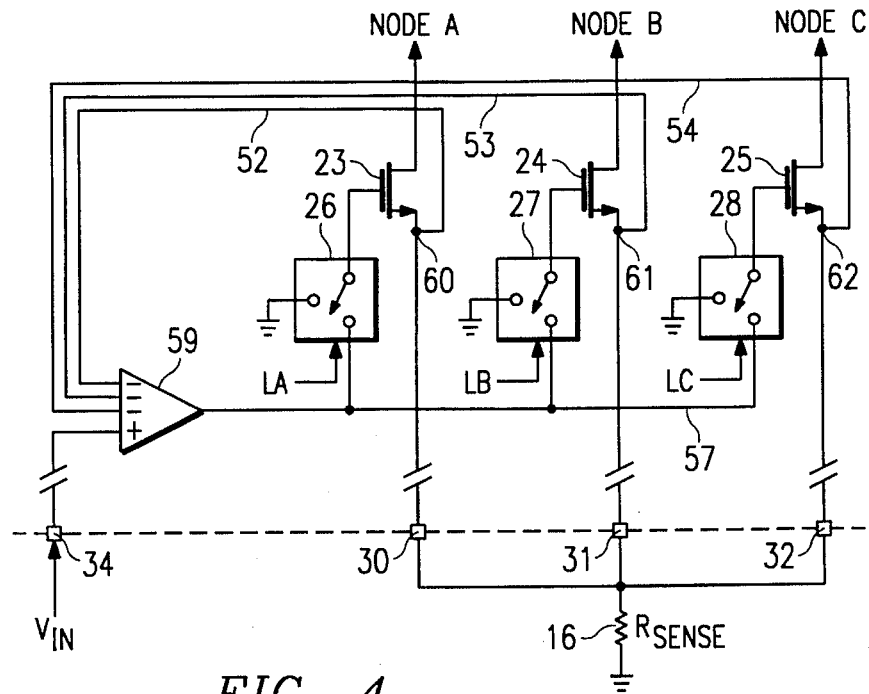
FIG. 4 is an electrical schematic diagram that represents a generic embodiment of a kelvin current sensing circuit as shown in FIGS. 2 and 3.

FIG. 4 shows another preferred embodiment of the invention that is analytically similar to the embodiments shown in FIGS. 2 and 3. Again, for simplicity the upper driver transistors, the stator windings of the DC motor above the nodes A, B, and C, and the bonding pads and their connections are not shown. In the circuit embodiment shown in FIG. 4, the transistors 40–45 and the operational amplifier 58 have been replaced with a multiple input operational amplifier 59. The inverting inputs of the operational amplifier 59 are connected to line 52, 53, and 54 from the source of the respective lower driver transistors 23, 24, and 25. Again, the output from multiple input operational amplifier 59 on signal line 57 is connected to transistor switches 26, 27, and 28. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

What is claimed is:

1. A kelvin current sensing circuit in a control circuit for operating a polyphase DC motor having a rotor and a plurality of stator coils, said control circuit having a plurality of control transistors to energize sequentially the stator coils, and having a plurality of output nodes for connection to a sense resistor, said output nodes being connected to at least some of the control transistors, wherein a current flowing in the stator coils flows through the sense resistor, the kelvin current sensing circuit comprising:

a plurality of current sensing transistors, each having a control electrode connected to an associated one of the control transistors, for conducting a current responsive to the current conducted by its associated control transistor;

a differential amplifier, having a first input receiving a reference voltage, and connected to each of said plurality of current sensing transistors in such a manner as to produce a differential sense output derived from the state of the control transistors and the reference voltage; and an amplifier connected to produce an output signal to control the control transistors, said output signal being responsive to the differential sense output.

2. A kelvin current sensing circuit as claimed in claim 1 further comprising a plurality of switches each connected to the control transistors connected to said output nodes, said switches are operated in response to sequence signals to connect a control element of the respective control transistors to an output of the comparator when the respective control transistor is selected and to connect the control element to a voltage potential to turn off the control transistor when the control transistor is not selected.

3. A kelvin current sensing circuit as claimed in claim 1, wherein the kelvin current sensing circuit and the control circuit are contained in a single semiconductor chip, and wherein the current sensing transistors are located adjacent to the respective control transistors.

4. A kelvin current sensing circuit as claimed in claim 1, wherein one side of the differential amplifier comprises the plurality of current sensing transistors connected in parallel, with each of the current sensing transistors having a current path and a current control electrode controlled by its associated control transistor.

5. A kelvin current sensing circuit as claimed in claim 1, wherein the differential amplifier has current paths between a current source and current sinks, and the comparator is connected to the differential amplifier on the side of the current sinks.

6. A kelvin current sensing circuit as claimed in claim 5, wherein the current sinks are resistors.

7. A kelvin current sensing circuit as claimed in claim 5, wherein the current source is a saturated transistor.

8. A kelvin current sensing circuit as claimed in claim 1, wherein the amplifier is an operational amplifier.

9. A kelvin current sensing circuit in a control circuit for operating a polyphase DC motor having a rotor and a plurality of stator coils, said control circuit having a plurality of control transistors to sequentially energize the stator coils, and having a plurality of output nodes for connection to a sense resistor, said output nodes being connected to at least some of the control transistors wherein a current flowing in the stator coils flows through the sense resistor, the kelvin current sensing circuit comprising:

an amplifier having an inverting input and a noninverting input and operative to produce an output signal corresponding to the difference in the voltages at the inverting input and the noninverting input, the output signal from the amplifier being applied to the control transistors connected to said output nodes;

a plurality of voltage sensing transistors, each having a current path connected in parallel between a first current source and a first bias voltage, and each having a current control element controlled by an associated one of the control transistors a first transistor having a current path between a second current source and the first bias voltage, and having a control element controlled by an input reference voltage;

a second transistor having a current path between a third current source and a first load element, and having a current control element coupled to the plurality of voltage sensing transistors, so that a voltage produced across the first load element is responsive to the currents conducted by the plurality of voltage sensing transistors and is applied to the inverting input of the amplifier; and a third transistor having a current path between the third current source and a second load element, and having a current control element coupled to the first transistor, so that a voltage produced across the second load element is responsive to the current conducted by the first transistor and is applied to the noninverting input of the amplifier.

10. A kelvin current sensing circuit as claimed in claim 9, wherein the plurality of voltage sensing transistors and the first transistor through third transistor are at least one of bipolar transistors, MOS transistors, and FET transistors.

11. A kelvin current sensing circuit as claimed in claim 10, wherein the bipolar transistors are PNP transistors.

12. A kelvin current sensing circuit as claimed in claim 9, wherein the plurality of voltage sensing transistors for a three-phrase DC motor comprises three transistors.

13. A kelvin current sensing circuit as claimed in claim 9, wherein the first and second load elements each comprise a resistor.

14. A kelvin current sensing circuit as claimed in claim 9, wherein the first current source through the third current source are saturated transistors.

15. A kelvin current sensing circuit as claimed in claim 9, wherein the amplifier is an operational amplifier.

16. A kelvin current sensing circuit as claimed in claim 8, wherein the kelvin current sensing circuit and the control circuit are contained on a single semiconductor chip, and wherein the voltage sensing transistors are located adjacent to the respective control transistors.

17. A kelvin current sensing circuit that is part of a control circuit for operating a polyphase DC motor having a rotor and a plurality of stator coils, said control circuit having a plurality of control transistors to sequentially energize the stator coils, and having a plurality of output nodes for connection to a sense resistor, said output nodes being connected to at least some of the control transistors wherein a current flowing in the stator coils flows through the sense resistor, the kelvin current sensing circuit comprising:

an amplifier having an inverting input and a noninverting input and operative to produce an output signal corresponding to the difference in the voltages at the inverting input and the noninverting input, the output signal from the amplifier being applied to the control transistors connected to said output nodes;

a first transistor having a current path between a first current source and a first load element, and having a current control element controlled by an input reference voltage, so that a voltage produced across the first load element responsive to the input reference voltage is applied to the noninverting input of the amplifier; and a plurality of voltage sensing transistors, each having a current path connected in parallel between the current source and a second load element, each of the plurality of voltage sensing transistors having a control element coupled to an associated one of the control transistors to produce a voltage across the second load element responsive to the currents conducted by the plurality of voltage sensing transistors that is applied to the inverting input of the amplifier.

18. A kelvin current sensing circuit as claimed in claim 17, wherein the first transistor and the plurality of voltage sensing transistors are at least one of bipolar transistors, MOS transistors, and FET transistors.

19. A kelvin current sensing circuit as claimed in claim 18, wherein the bipolar transistors are PNP transistors.

20. A kelvin current sensing circuit as claimed in claim 17, wherein the plurality of voltage sensing transistors for a three-phase DC motor comprises three transistors.

21. A kelvin current sensing circuit as claimed in claim 17, wherein the current source is a saturated transistor.

22. A kelvin current sensing circuit as claimed in claim 17, wherein the first current sink and the second current sink are resistors.

23. A kelvin current sensing circuit as claimed in claim 17, wherein the amplifier is an operational amplifier.

24. A kelvin current sensing circuit as claimed in claim 17, wherein the kelvin current sensing circuit and the control circuit are contained on a single semiconductor chip, and wherein the voltage sensing transistors are located adjacent to the respective control transistors.

25. A method of kelvin current sensing in a control circuit for operating a polyphase DC motor having a rotor and a plurality of stator coils, said control circuit having a plurality of control transistors to sequentially energize the stator coils, and having a plurality of output nodes for connection to a sense resistor, said output nodes being connected to at least some of the control transistors, wherein a current flowing in the stator coils flows through the sense resistor, said method comprising the steps of:

sensing a plurality of output voltages, each output voltage corresponding to the current conducted by a corresponding one of the control transistors;

determining a lowest one of the plurality of output voltages;

comparing the lowest one of the plurality of output voltages to a reference voltage to produce an output signal; and applying the output signal to the control transistors.

* * * * *